US005174750A

United States Patent [19]

Flading et al.

[11] Patent Number: 5,174,750

[45] Date of Patent: Dec. 29, 1992

[54] CIRCUMFERENTIAL SEAL SYSTEM FOR A ROTARY COMBUSTOR

[75] Inventors: Donald P. Flading, Manor Boro; Robert S. Mavretish, New Stanton, both of Pa.

[73] Assignee: Westinghouse Electric Corp., Pittsburgh, Pa.

[21] Appl. No.: 707,371

[22] Filed: May 30, 1991

[51] Int. Cl.[5] .......... F27B 7/24; F16J 15/32

[52] U.S. Cl. .......... 432/115; 432/117; 432/118; 110/246

[58] Field of Search .......... 110/246, 234; 432/117, 432/118, 103, 115

[56] References Cited

U.S. PATENT DOCUMENTS 3,836,324 9/1974 Shaefer et al. .......... 432/115
4,714,031 12/1987 Healy et al. .
4,728,289 3/1988 Samera. Jr. .......... 432/115
4,836,560 6/1989 Haberberger .......... 432/115
4,961,588 10/1990 Brienza .
4,972,786 11/1990 Blasiole .

*Primary Examiner*—Henry C. Yuen
*Attorney, Agent, or Firm*—G. H. Telfer

[57] ABSTRACT

A circumferential seal system wherein both low differential pressure circumferential seals and high differential pressure circumferential seals are utilized to provide the proper sealing for various wind box plenum zones supplying combustion air to a rotary combustor utilized to effectively burn solid municipal waste and maintain acceptable levels of CO even when there are large swings in the moisture content and heating value of the solid municipal waste.

6 Claims, 4 Drawing Sheets

CIRCUMFERENTIAL SEAL SYSTEM FOR A ROTARY COMBUSTOR

BACKGROUND OF THE INVENTION

The invention relates to a circumferential seal system for a rotary combustor and more particularly to a circumferential seal system disposed between zone wind box plenums of a rotary combustor to provide the optimum sealing for the zone being sealed.

In rotary combustors in which municipal solid waste is burned to generate heat, the waste is burned in a barrel shaped combustor having a plurality of wind box plenums for supplying combustion air to burn the waste. There are usually three or four wind box plenums which supply combustion air to three or four axially disposed zones in the combustor. Proper combustion requires that the air flow in each zone be separately controlled, thus requiring that reliable circumferential seals be installed between the zones. U.S. Pat. No. 4,714,031 shows the seal originally utilized in such apparatus. U.S. Pat. No. 4,961,588 shows such a seal with a plurality of fingers made up of a seal strip having a plurality of layer of material one of which is a heat insulating material. U.S. Pat. No. 4,972,786 shows a seal strip forming a running seal on a cylindrical surface.

SUMMARY OF THE INVENTION

Among the objects of the invention may be noted the provision of circumferential seal, which accommodates axial thermal expansion of the rotary combustor, requires the minimum amount of maintenance and provides the proper seal for the area in which it is utilized.

In general, a circumferential seal system is provided for a rotary combustor disposed on an inclined axis in a housing having an inlet end into which solid waste is introduced and outlet end from which flue gas and ash are dispelled. A plurality of wind box plenums are provided for supplying specific amounts of combustion air to a plurality of axially disposed combustion air zones in the rotary combustor. Adjacent wind box plenums are separated by a wall and a circumferential seal. When made in accordance with this invention, the seal system comprises a first circumferential seal comprising a first circumferential band having a major surface parallel to the axis and affixed to the rotary combustor and a thin seal strip, which engages said major surface of the first circumferential band and is disposed to form an acute angle therewith. The thin seal strip cooperates with said major surface of the first circumferential band to allow for thermal expansion of the rotary combustor and to form a high pressure circumferential seal between the wind box plenum adjacent the outlet end of the rotary combustor and the adjacent wind box plenum. Other wind box plenums are separated by a wall and a second circumferential seal comprising a second circumferential band having a major surface parallel to the axis of the combustor and disposed adjacent the outer periphery of the rotary combustor and a seal strip forming a ring having a major surface disposed parallel to a plane perpendicular to the axis of the rotary combustor and a distal margin spaced from the major surface of the second circumferential band to form a low pressure circumferential seal without rubbing contact. The second circumferential seal also provides for differential thermal expansion of the rotary combustor.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

DESCRIPTION OF THE PREFERRED EMBODIMENT

Figure 1:
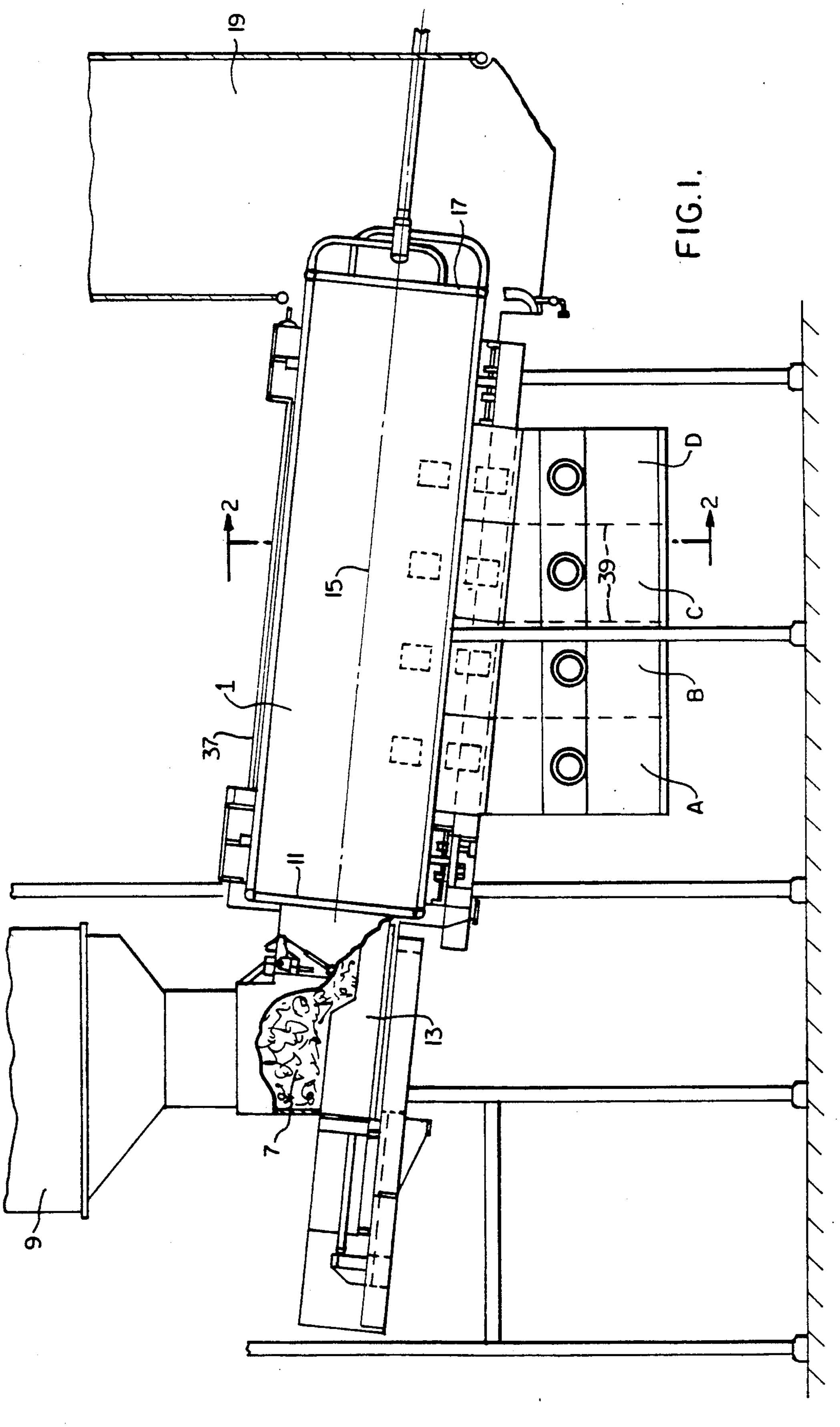
FIG. 1 is a partial sectional view of a rotary combustor utilized to burn municipal solid waste.

Referring now to the drawings in detail and in particular to FIG. 1 there is shown a rotary combustor 1 formed from a cylindrical array of cooling pipes 3 spaced apart by perforated webs 5, which allow combustion air to enter the combustor 1. Municipal solid waste 7 is supplied through a hopper 9 and pushed into an inlet end 11 of the rotary combustor 1 by a hydraulically operated ram 13. As the rotary combustor 1 slowly rotates on an inclined axis 15 the waste tumbles and burns and exits an outlet end 17 as ash and flue gas. The flue gas is utilized in a waste heat boiler 19 to make steam which is converted to electricity by a turbine generator set (not shown). To control the burning of the waste, which varies in moisture content and heating value, combustion air is supplied in varying amounts to a plurality of axially disposed combustion zones having a separate corresponding wind box zone A, B, C or D. Zone A being adjacent the inlet end 11 of the combustor 1 and zone D being adjacent the outlet 17 end of the combustor 1.

Figure 2:
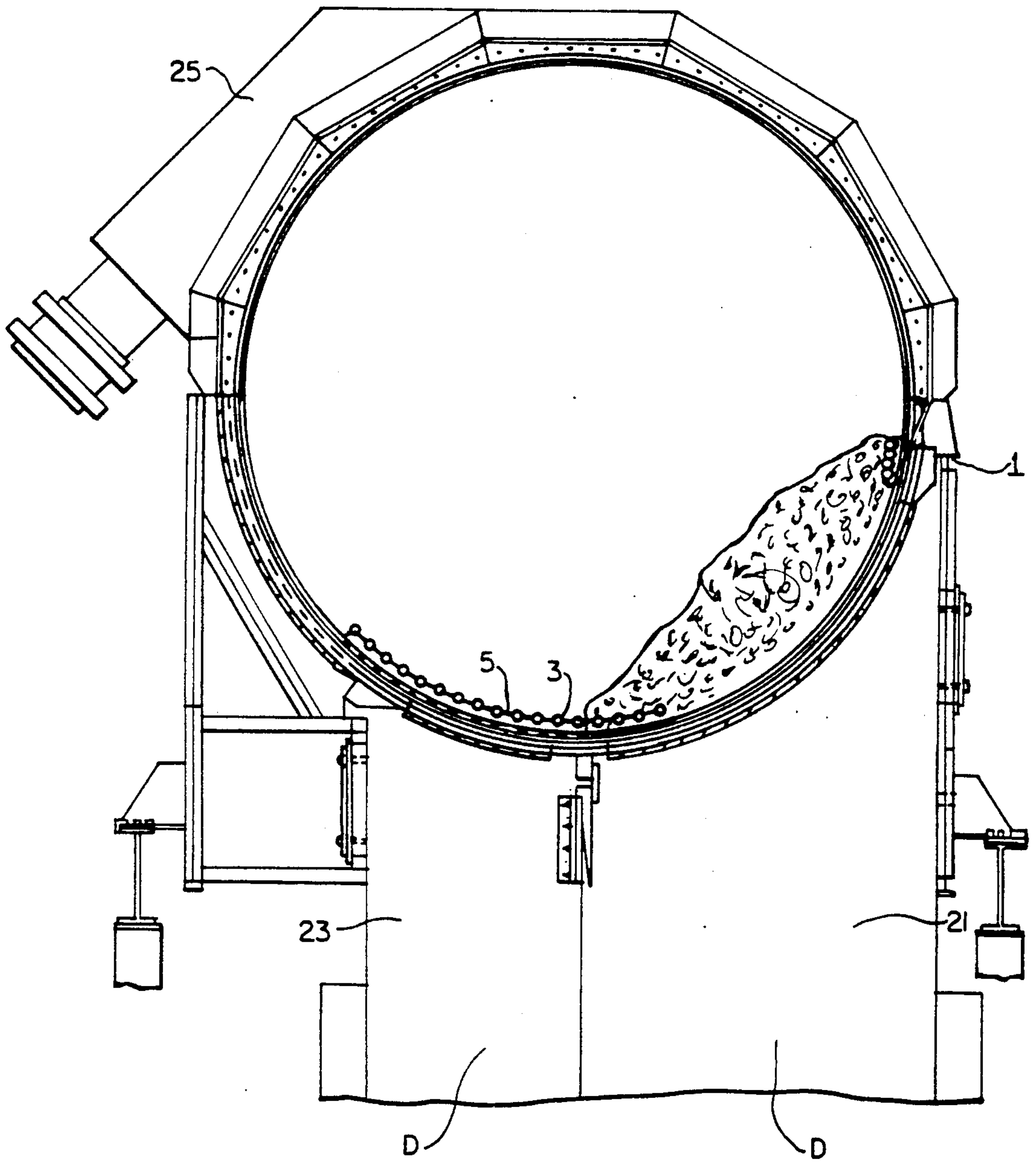
FIG. 2 is an enlarged sectional view taken on line 2—2 of FIG. 1 showing a high differential pressure seal.

As shown in FIG. 2 for zone D, in order to supply the specific amount of combustion air to each zone, the wind box zones A, B, C, and D are each divided into two portions including an under fire portion 21, which supplies combustion air under the burning waste, and an over fire portion 23, which supplies combustion air to an area adjacent the burning waste. In addition, in order to control the CO content of the flue gas, it is necessary to have the capability of supplying a substantial quantity of over the combustor air into zone D adjacent the outlet end 17 of the rotary combustor 1. Over the combustor air is supplied by a separate duct 25. At times, when the amount of CO increases, substantial amounts of over the combustor air must be supplied over the burning waste to reduce the CO in the flue gas, resulting in a high differential pressure between zones C and D.

Figure 3:
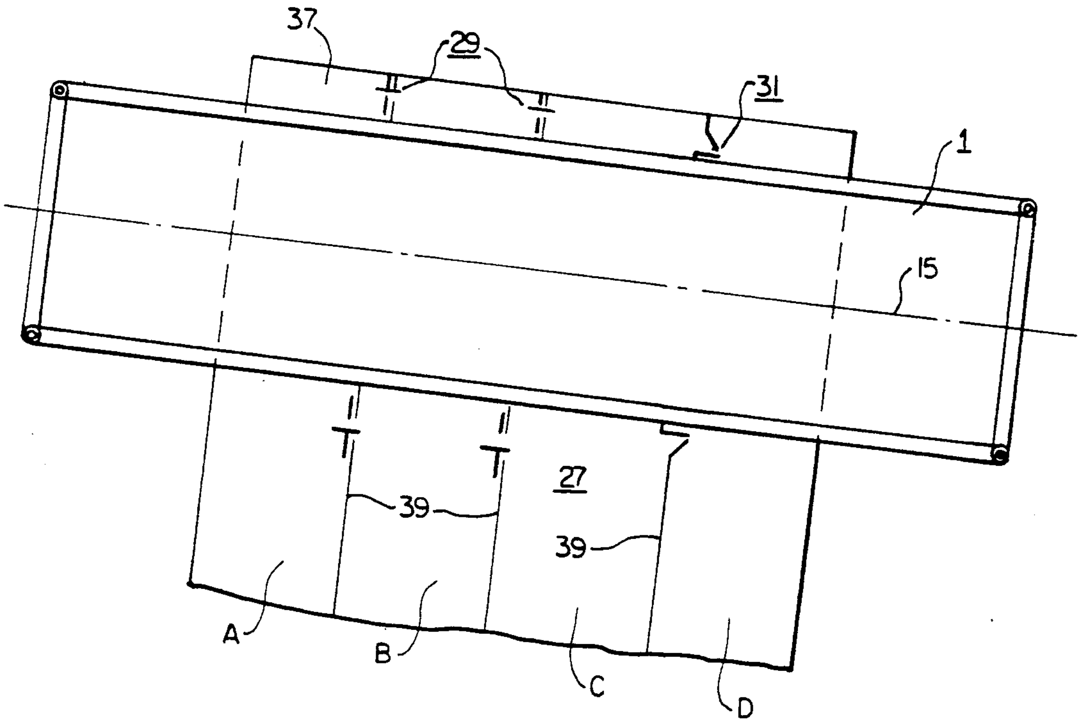
FIG. 3 is a schematic drawing showing the rotary seal system utilized to limit the flow of combustion air between wind box zones.

To maintain the integrity of each combustion air zone requires a reliable circumferential seal system 27 having, as shown schematically in FIG. 3, a low differential pressure circumferential seal 29 with high reliability and no contacting parts and a high differential pressure circumferential seal 31 having rubbing contact between the sealing elements.

Figure 4:
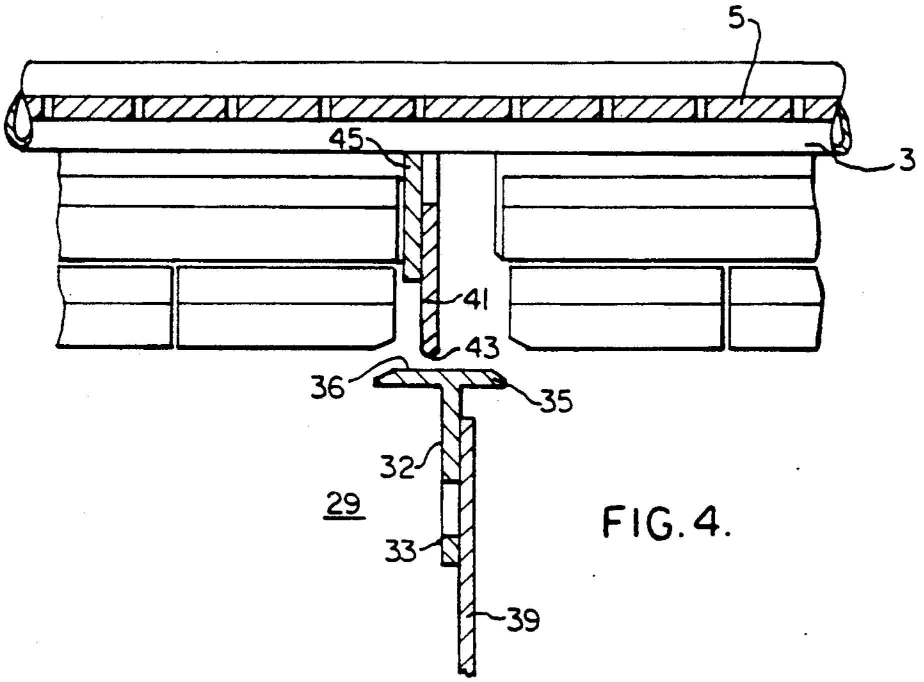
FIG. 4 is an enlarged partial sectional view showing a low differential pressure circumferential seal.

FIGS. 3 and 4 show the low differential pressure circumferential seal 29, which comprises a plurality of arcuate T shaped members 32 having a stem portion 33 and cross portion 35. The cross portion 35 forming a circumferential band having a major surface 36, which is generally parallel to the axis of rotation of the rotary combustor 1, is generally cylindrical in shape and is disposed adjacent the outer periphery of the rotary combustor 1. The T shaped member 32 is shown affixed to a rotary combustor housing 37 or a division wall 39 of a wind box. A seal strip 41 is disposed to cooperate with the cross portion 35 of the T shaped member to form a seal. The seal strip 41 is a ring shaped member with a major surface parallel to a plane perpendicular to the axis of rotation of the rotary combustor and has a distal margin 43 spaced a fixed distance from the major surface 36 on the cross portion 35 of the T shaped member 32. The seal strip 41 is attached to a support ring 45 that is affixed to the rotary combustor 1.

Figure 5:
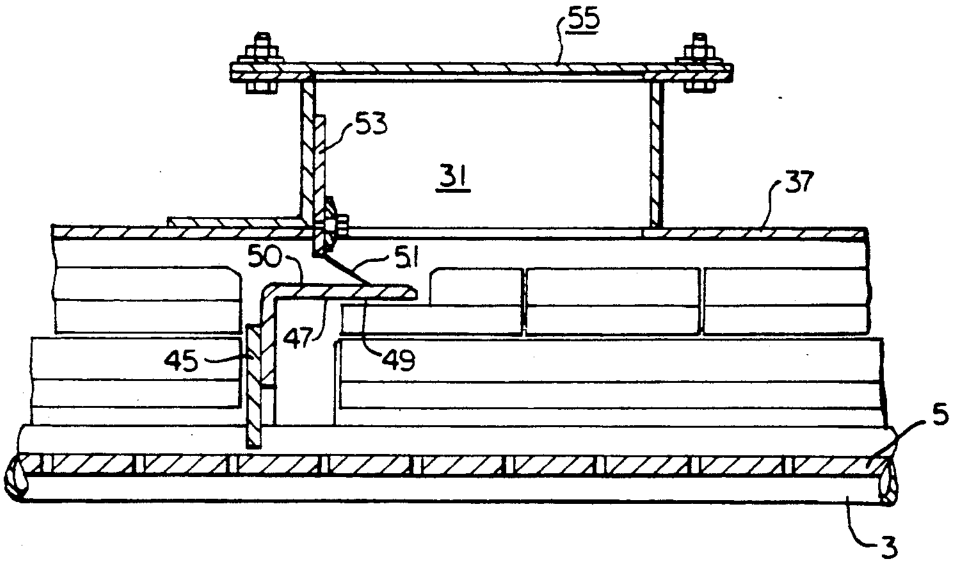
FIG. 5 is an enlarged partial sectional view showing a high differential pressure circumferential seal.

FIGS. 3 and 5 show a high differential pressure circumferential seal 31 comprising an L shaped member 47 having a leg portion 49 forming a circumferential band having a major surface 50, which is generally parallel to the axis of rotation of the rotary combustor 1, is generally cylindrical in shape and is disposed adjacent the outer periphery of the rotary combustor 1. The other leg of the L shaped member 47 is attached to the support ring 45 affixed to the rotary combustor 1. A thin stainless steel seal strip 51 is disposed to engage the major surface 50 of the leg 49 and form an acute angle therewith, the acute angle being disposed on the low pressure side of the thin seal strip 51. A seal support 53 is attached to the housing 37 and the seal strip 51 is fastened to the seal support 53. The thin seal strip 51 is made of arcuate segments providing for easy replacement of damaged or worn segments of seal strip 51. The housing 37 is provided with hand holes with bolted on covers 55 for replacing worn or damaged segments of seal strips 51.

The circumferential seals 29 and 31 forming the circumferential seal system 27 advantageously provide for differential thermal expansion of the rotary combustor 1, eliminate rubbing contact and close tolerance fit ups where pressure differentials are minimum to reduce maintenance, enhance fabrication and provide a simple low maintenance high differential pressure seal to allow for effective control of the CO content of the flue gas.

While the preferred embodiments described herein set forth the best mode to practice this invention presently contemplated by the inventors, numerous modifications and adaptations of this invention will be apparent to others skilled in the art. Therefore, the embodiments are to be considered as illustrative and exemplary and it is understood that the claims are intended to cover such modifications and adaptations as they are considered to be within the spirit and scope of this invention.

We claim:

1. A circumferential seal disposed between a rotary combustor having an inclined axis and a casing and a zone wall in a wind box, said seal comprising a circumferential band disposed adjacent the outer periphery of the rotary combustor, the circumferential band having a major surface extending axially with respect to the rotary combustor, and a seal strip disposed to cooperate with the major axially extending surface to form a seal which allows for differential thermal expansion between the rotary combustor and the casing and the zone wall, wherein the major axial surface is affixed to the casing and zone wall and the seal strip is affixed to the rotary combustor.

2. The circumferential seal of claim 1, wherein the seal strip is disposed parallel to a plane perpendicular to the axis of the rotary combustor and the seal strip has a distal margin which is spaced a small distance from the major axial surface eliminating all rubbing contact yet providing an adequate seal.

3. A circumferential seal system for a rotary combustor disposed on an inclined axis in a housing and having an inlet end into which solid waste is introduced and outlet end from which flue gas and ash are dispelled and having a plurality of wind box plenums for supplying specific quantities of combustion air to a plurality of axially disposed combustion air zones in the rotary combustor; adjacent wind box plenums being separated by a wall and a circumferential seal; the wind box plenum adjacent the outlet end of the rotary combustor being separated from the adjacent wind box plenum by a first circumferential seal comprising a first circumferential band having a major surface parallel to the axis and affixed to the rotary combustor and a thin seal strip which engages said major surface of the first circumferential band and is disposed to form an acute angle therewith and cooperate with said major surface of the first circumferential band to allow for thermal expansion of the rotary combustor and form a high pressure circumferential seal between the wind box plenum adjacent the outlet end of the rotary combustor and the adjacent wind box plenum and other wind box plenums being separated by a wall and a second circumferential seal comprising a second circumferential band having a major surface parallel to the axis of the rotary combustor and adjacent the outer periphery of the rotary combustor and a seal strip forming a ring having a major surface disposed parallel to a plane perpendicular to the axis of the rotary combustor and a distal margin spaced from the major surface of the second circumferential band to form a low pressure circumferential seal without rubbing contact and providing for differential thermal expansion of the rotary combustor.

4. The circumferential seal system of claim 3, wherein the second circumferential band is affixed to the housing and the wall forming the zone separation.

5. The circumferential seal system of claim 3, wherein the second circumferential band is formed to have a T shaped cross section having a stem and cross portion with the stem portion being affixed to the housing and wall forming the zone separation and the major surface being on the cross portion.

6. The circumferential seal system of claim 3, wherein the first circumferential seal comprises an arcuate portion depending from the housing and the thin seal strip is affixed thereto.

* * * * *